United States Patent [19]
Guisti

[11] 3,984,919
[45] Oct. 12, 1976

[54] LEVELING DEVICE

[76] Inventor: Richard E. Guisti, 308 Mauran Ave., East Providence, R.I. 02914

[22] Filed: Oct. 20, 1975

[21] Appl. No.: 624,174

[52] U.S. Cl. ............................................... 33/381
[51] Int. Cl.² .......................................... G01C 9/28
[58] Field of Search ............ 33/348, 379, 381, 382, 33/383, 290, 384

[56] References Cited
UNITED STATES PATENTS

| | | | |
|---|---|---|---|
| 354,076 | 12/1886 | Webb | 33/381 |
| 719,061 | 1/1903 | Traut | 33/383 |
| 926,661 | 6/1909 | Lieby | 33/383 |
| 1,303,829 | 5/1919 | Vogel | 33/381 |
| 3,311,988 | 4/1967 | Manville | 33/372 X |
| 3,435,533 | 4/1969 | Whitfield | 33/347 |
| 3,766,657 | 10/1973 | Hopkins | 33/348 |

FOREIGN PATENTS OR APPLICATIONS 804,720  11/1958  United Kingdom ................. 33/381

*Primary Examiner*—Charles E. Phillips
*Attorney, Agent, or Firm*—Salter & Michaelson

[57] ABSTRACT

A leveling device for determining the level of surfaces and the like comprising an elongated stock having parallel top and bottom surfaces and parallel opposed side surfaces wherein a cluster of individual spirit tubes are adapted to be received in sockets formed on each side of such device. Portions of the stock positioned outward of such tubes are removed so that at least one and preferably paired sets of said tubes are visible when the device is sighted from any direction.

4 Claims, 7 Drawing Figures

LEVELING DEVICE

BACKGROUND OF THE INVENTION

Leveling devices which incorporate a plurality of spirit tubes so that at least one thereof may be seen and read when the device is sighted from more than one direction are known. However, it is usually necessary with such devices to sight generally normal to the main surface plane in which such tube is mounted in order for such to be visible. Also while certain attempts have been made to enable a spirit tube mounted in one plane to be observed when sighted from a different plane, such attempts have been generally limited to top plane viewing such as shown in the device disclosed in U.S. Pat. No. 756,628, issued Apr. 5, 1904. The spirit level of this and other similar prior art devices may be viewed when sighted from the side or the top but may not be viewed from either end thereof, as when leveling surfaces at eye level or above one's head. The need thus exists for a leveling device which can be read from any position including sightings directly from the top, bottom, sides, and ends thereof.

It is also known to provide leveling devices with protective means such as surface covering screw fastened plates or interior placement in order to prevent such tubes from being damaged by accidental contact with objects at work sites. However, when utilizing a plurality of spirit tubes it would be impractical to provide several plates or such interior placement, especially since such means inhibit the ease of viewing sought by increasing the number and placement of such tubes. It would thus be useful to provide a leveling device which provides ease of viewing without sacrificing the need to protect the spirit tube means.

SUMMARY OF THE INVENTION

The present invention accomplishes the above-indicated aims, while avoiding the shortcomings of the prior art devices through the provision of a leveling device having an elongated stock including parallel top and bottom surfaces and parallel opposed side surfaces, and a cluster of individual spirit tubes formed of a tough resilient plastic material inwardly mounted on each side of said stock intermediate the ends thereof, and slightly below planes defined by said respective side surfaces. Stock portions outwardly adjacent to the spirit tube positions are removed so that at least one and preferably paired sets of tubes may be seen from any direction of sighting.

It is therefore a primary object of the instant invention to provide a leveling device that can be read from any position of use.

Another object of the invention is the provision of a leveling device having opposed clusters of spirit tubes so positioned that remaining surrounding stock portions reduce the chance of accidental contact of such tubes with objects at construction sites.

Still another object of the invention is the provision of a leveling device wherein the individual spirit tubes thereof, are formed of tough resilient plastic material so that if accidental contact therewith does occur, the tubes will not break.

Another object of the invention is the provision of a leveling device wherein respective paired sets of spirit tubes viewable from any sighting direction are provided with permanent center markings matched to the width of the center bubble level formed in portions of stock intermediate or bridging said paired sets of tubes.

Other objects, features and advantages of the invention will become apparent when the description thereof proceeds when considered in connection with the accompanying illustrative drawing.

DESCRIPTION OF THE DRAWING

In the drawing which illustrates the best mode presently contemplated for carrying out the invention.

DESCRIPTION OF THE INVENTION

Figure 6:
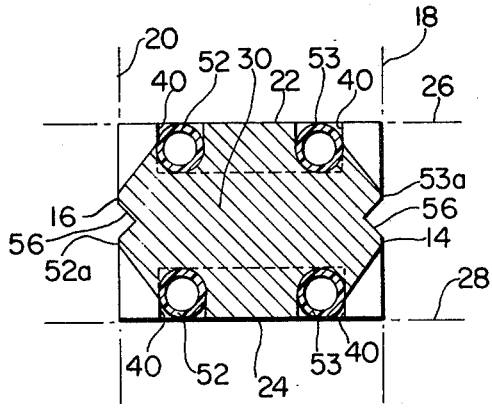
FIG. 6 is an end sectional view taken along the line 6—6 of FIG. 2.

Referring now to the drawing, a leveling device constructed in accordance with the instant invention is shown generally at 10 and includes an elongated stock 12 having parallel top and bottom walls or surfaces 14 and 16, respectively. Such top and bottom surfaces further serve to define respective top and bottom parallel planes 18 and 20 as best depicted in FIG. 6 of the drawing. The stock 12 also includes respective side surfaces 22 and 24 which, respectively, serve to define parallel opposed planes 26 and 28 also best shown in FIG. 6 of the drawing.

Figures 3, 5:
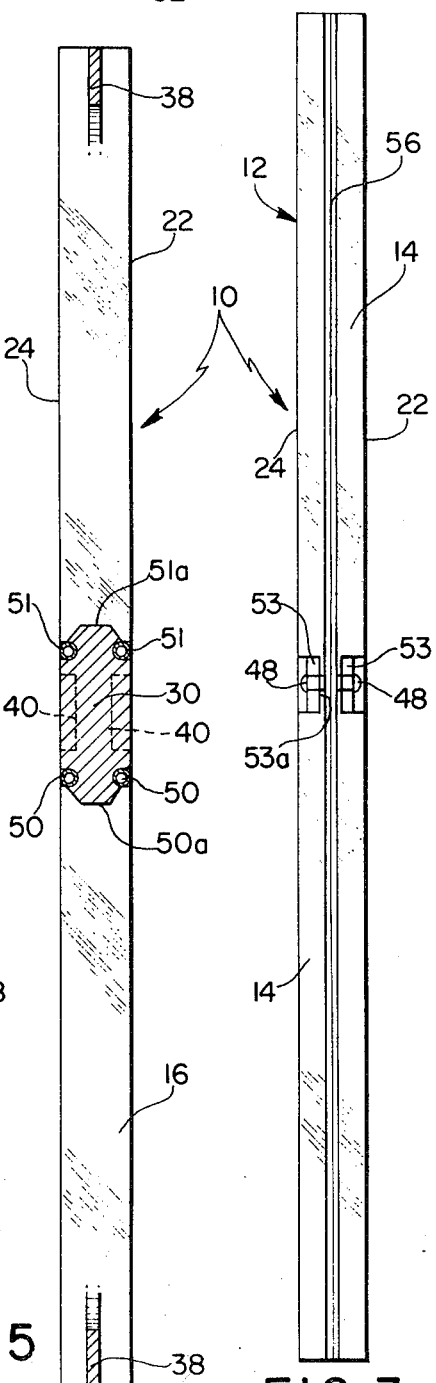
FIG. 3 is a top plan view thereof, and showing the device in a horizontally level attitude.
FIG. 5 is a top sectional view taken along the line 5—5 of FIG. 4.

The majority of the side-to-side portions of the stock 12 are preferably removed at either end of a central connecting portion 30 to define openings 32 and 34. The top and bottom surfaces 14 and 16, respectively, in addition to the central connecting portion 30 are interconnected by centrally positioned web members 36 and 38, thereby defining an "I"-shape configuration when the device is viewed from either end (note FIG. 1). The side surfaces of 22, 24 of central connecting member 30 each define a planar face having tapered portions 50a and 51a at opposite ends thereof. A plurality of oppositely disposed, slightly curved sockets 40 (note FIGS. 2, 5 and 6), each adapted to receive an individual spirit tube 42 in the form of a banana vial formed of a tough, resilient plastic material, such as polyvinylchloride, and preferably cylindrically shaped, that is, having a tubular body 44 and closed end walls 46, are provided in connecting member 30. Each spirit tube 42 is thus adapted for receipt and partial filling by a liquid material so that an air bubble 48 will appear centrally thereof when the containing tube is positioned in a level attitude as is well known. A suitable liquid for use in such plastic spirit tubes 42 of the present invention preferably includes pure alcohol or a mixture of alcohol and water. The stock 12 is preferably formed of a light machinable metal such as aluminum.

Figure 1:
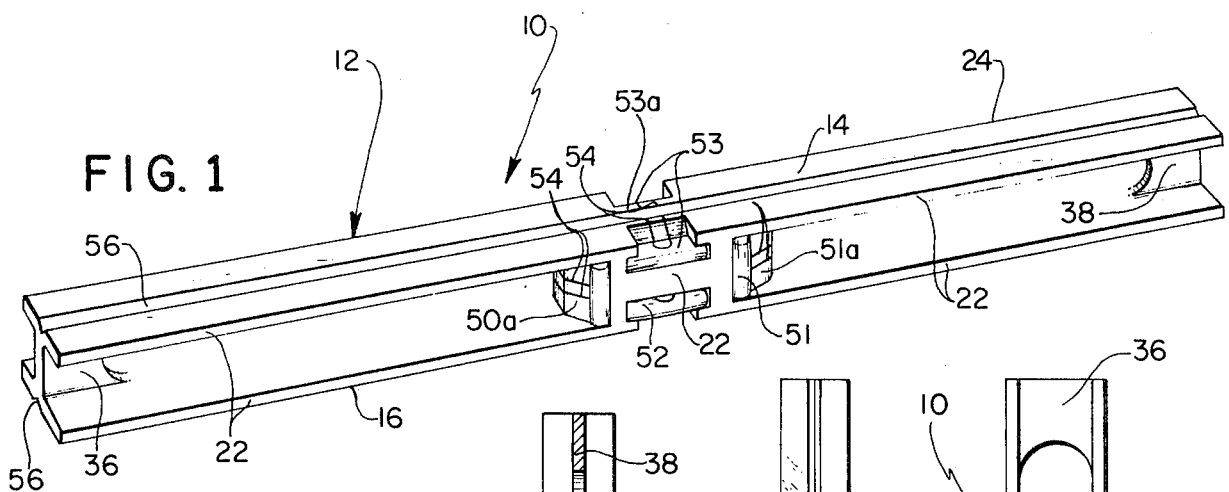
FIG. 1 is a perspective view of a leveling device constructed in accordance with the instant invention.
Figure 4:
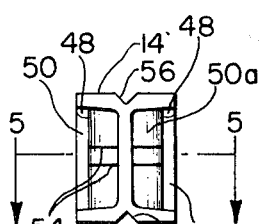
FIG. 4 is an end view thereof.
Figure 7:
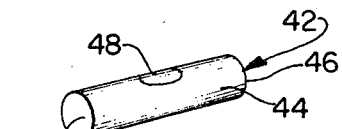
FIG. 7 is a perspective view of one of the several individual and removable spirit tubes utilized in the construction of the device of the present invention.
Figure 2:
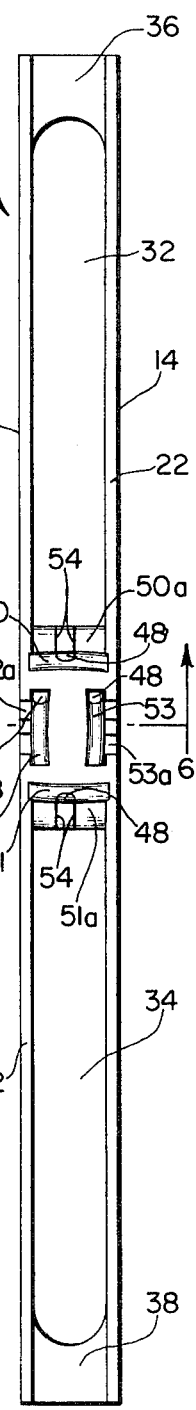
FIG. 2 is a side view of the device shown in FIG. 1 of the drawing wherein said device is in a vertically level attitude.

As best seen by references to FIG. 1 and 2 of the drawing, the sockets 40 are positioned in clusters on each side 22, 24 of the stock so as to present pairs of parallelly positioned tubes; a first pair of tubes 50 and 51 mounted normal to the longitudinal extent of the stock and a second pair of tubes 52 and 53 mounted parallel to the longitudinal extent of the stock. Similar pairs of tubes are received in sockets on the opposite side 24 of the device. It is thus apparent that two opposed clusters of tubes are presented wherein similarly positioned tubes from each such cluster form sets of end, top and bottom viewable tubes; that is, sets of tubes which are visible and from which level readings may be observed when viewed directly from virtually any direction. Thus, the uppermost tubes 53 of each cluster form a set of top viewable tubes; lowermost tubes 52 form a set of bottom viewable tubes and tubes 50 and tubes 51 located at respective end positions of the central connecting member 30, respectively, form sets of end viewable tubes.

Inasmuch as each cluster of tubes is mounted adjacent to but slightly below planes 26 and 28, defined by the respective side surfaces 22 and 24, i.e., the depth of sockets 40 is slightly greater than the diameter of tubes 42, it will be apparent that the bubble levels of the spirit tubes in each such cluster are readily viewable when the device is viewed from the side. However, in order that the device may be clearly read when sighted directly from its ends, portions of the central connecting member 30 which bridge respective sets of end (50,50) (51,51) top (53,53) and bottom (52,52) viewable tubes are removed outwardly thereof. The bridging portion of the central connecting member 30 bridging the top set of tubes 53 is designated 53a, that bridging tubes 52 as 52a and that bridging respective tube sets 50 and 51 as 50a and 51a, respectively. Thus portions of side surfaces 22, 24 outward of tubes 53 and portions of the top surface 14 adjacent thereto, are removed, or notched in order to form such bridging or connecting surface 53a. The bridging surface 53a serves to, in effect, sight connect the top set of tubes 53, 53 whereby said tubes are visible when the device is viewed from directly above. Similarly, portions of side surfaces 22 and 24 outward of tubes 52 and portions of bottom surface 16 adjacent thereto are removed so as to form bridging surface 52a. Bridging surfaces 50a and 51a are, in effect, formed preferably, although not essentially, by the entire removal of portions of stock 12 so as to form opening 32 and 34 as previously indicated. Thus, openings of a smaller extent than those shown in the drawing or significantly cut out portions outwardly of the end sets of tubes but not extending entirely through the stock could be utilized and still provide unobstructed direct end sighting of the device. Additionally, each bridging surface [50a, 51a, 52a and 53a] is permanently marked as by painting or engraving with a pair of spaced lines 54 thereon as an aid in aligning the bubbles of each tube set when in a level position.

It is important to note that the surfaces 50a, 51a, 52a and 53a are all tapered or inclined whereby the lines 54 may be seen from different directions. More specifically, the lines on surface 53a may be seen when the device is viewed from the top or side, etc. It will further be seen (FIG. 1) that the sockets for tubes 50 and 51 are located at the juncture of the planar face of connecting member 30 and tapered bridging surfaces 50a and 51a whereby the side wall of said sockets adjacent said tapered surfaces is rearwardly disposed with respect to planar face 22, hence enabling the outermost portions of the tubes 50 or 51 to be visible when the device is viewed directly from either end.

It is thus apparent that the leveling device of the present invention may be utilized in a great number of positions unavailable to prior art devices since paired sets of spirit tubes are visible when the device is sighted from the top, bottom, sides or ends. Furthermore, the placement of each spirit tube in a cluster slightly below respective planes formed by the side surface 22 and 24 serves to protect the individual spirit tubes from injury by reducing their chance of accidental contact with objects at work sites or damage that would normally be caused by accidentally dropping the device. If, however, for some reason one or more such tubes are damaged they can be easily replaced by removal from their respective sockets and subsequent replacement since the tubes are dimensioned so as to be frictionally received by their mounting sockets. Additionally, inasmuch as the liquid is entirely encapsulated by each spirit tube, there is less likelihood of contamination by dirt than in spirit tube constructions of prior art devices wherein portions of the stock and separately attached members, removably attached as by means of screws, etc., and the like, frequently serve to cooperatively form the containment means for the fluid vehicle.

Also, the openings 32 and 34 in addition to providing unobstructed viewing for end tube sets 50 and 51, respectively, additionally serve as a convenient means by which the overall device may be grasped. Thus, if it is not comfortable or possible for the user of the device to completely encircle stock 12 on one's hand, the user can easily, by placing one's fingers through one of the openings 32, 34, completely grasp the device by the remaining portions of either the top or bottom surfaces thereof. The completely cut out openings 32 and 34 additionally serve to lighten the overall weight to the device, thus saving on material and making the device more easily manipulatable while web members 36 and 38 serve to assure relative parallel stability of the opposed top and bottom surfaces.

As will be seen most clearly in FIGS. 1, 3, 4 and 6, the top and bottom surfaces 14, 16 are provided with centrally positioned, longitudinally extending V-grooves 56 to facilitate engagement of the device 10 with elongated tubular members, such as pipes, rods, etc. More specifically, by engaging the tube, pipe or the like longitudinally within said V-groove, the device 10 will tend to remain more properly aligned for optimum sighting, and will have less tendency of sliding or slipping laterally with respect thereto.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:
1. A leveling device comprising an elongated stock having parallel top and bottom walls interconnected at opposite ends by centrally positioned longitudinally extending web portions defining an I-shape configuration when viewed from either end, a central connecting portion joining said top and bottom walls intermediate of said web portions, said connecting portion comprising parallel side walls each comprising a planar face having inwardly tapered portions at opposite ends thereof, a first pair of spaced top and bottom, slightly curved, elongated sockets extending longitudinally of the device and oppositely disposed to each other, said first pair of sockets being located adjacent the top and bottom edges of each of said side walls, and a second pair of similarly configured, oppositely disposed sockets extending in a transverse direction to said first pair and located on each side wall, a spirit tube snugly mounted in each of said sockets thus creating a cluster of four banana vials located on each side wall, said second pair of sockets being located at the juncture of said planar face and said tapered portions whereby one elongated edge of each said socket is positioned in said tapered portions and hence is inwardly disposed with respect to said planar face so that a portion of the tubes located therein is visible when the device is viewed from either end, the depth of said sockets measured from said planer face being slightly greater than the diameter of said tubes whereby the latter do not protrude beyond said planar face, and notched portions in said top and bottom walls in communication with said longitudinally extending sockets to render the tubes therein visible when the device is viewed from top or bottom.

2. In the device of claim 1, said planar faces extending between and being flush with the edges of said top and bottom walls.

3. In the device of claim 1, each of said notched portions comprising an inclined surface extending from said top and bottom walls to said sockets, said inclined surfaces and said tapered portions each having guide lines thereon indicating the center of the adjacent tube.

4. In the device of claim 1, said tubes being formed of a flexible, resinous material.

\* \* \* \* \*